W. SCHWEPPE.
TROLLEY.
APPLICATION FILED AUG. 30, 1911.
1,024,368.
Patented Apr. 23, 1912.
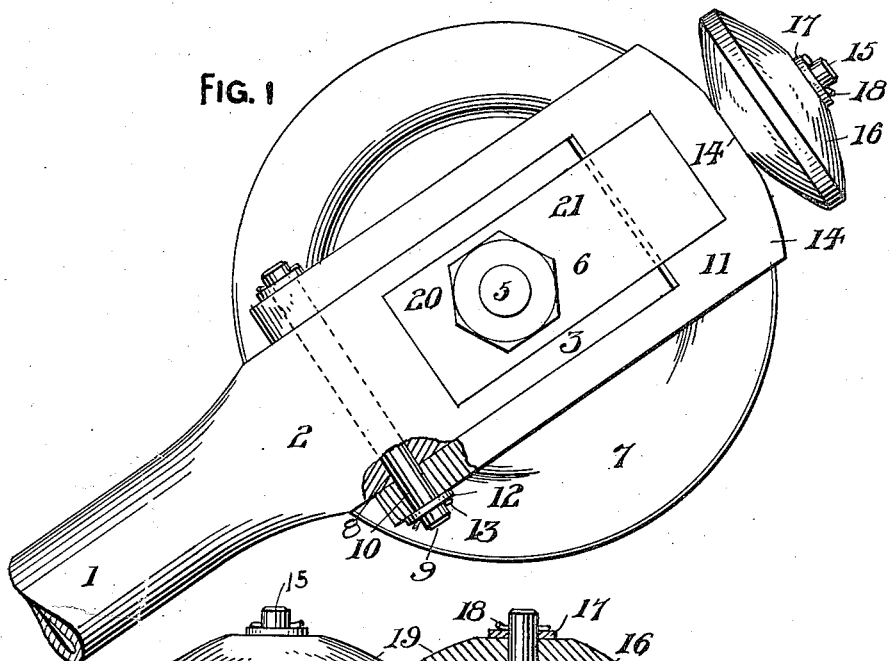
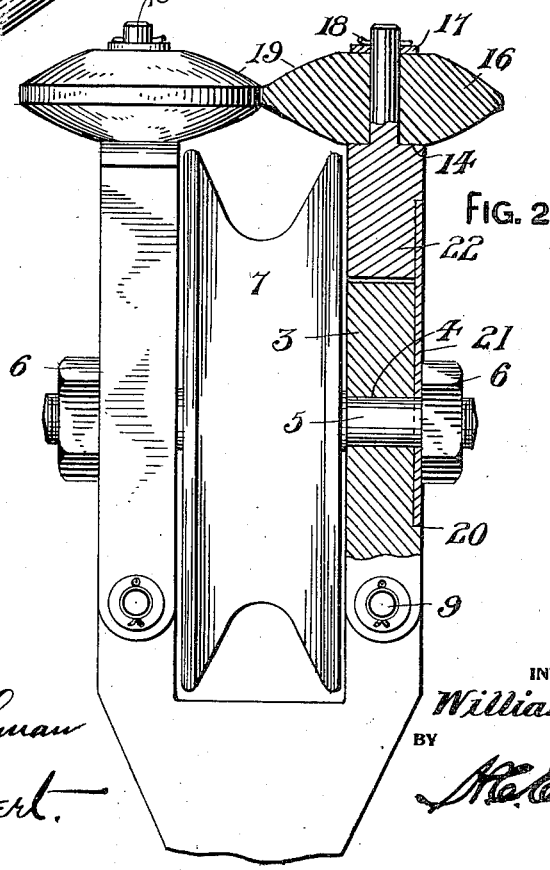
WITNESSES
INVENTOR
William Schweppe
BY
ATTORNEYS

UNITED STATES PATENT OFFICE.

WILLIAM SCHWEPPE, OF PITTSBURGH, PENNSYLVANIA.

TROLLEY.

1,024,368.  Specification of Letters Patent.  Patented Apr. 23, 1912.

Application filed August 30, 1911. Serial No. 646,839.

*To all whom it may concern:*

Be it known that I, WILLIAM SCHWEPPE, a citizen of the United States of America, residing at Pittsburgh, in the county of Allegheny and State of Pennsylvania, have invented certain new and useful Improvements in Trolleys, of which the following is a specification, reference being had therein to the accompanying drawing.

This invention relates to trolleys, and the primary object of my invention is to furnish a trolley harp with positive and reliable means, in a manner as will be hereinafter set forth, for retaining the trolley wheel of the harp upon a trolley wire, whereby the wheel cannot become displaced, due to the rapidity of the car, curved sections of trolley wire, or any irregularities in the wire.

Another object of this invention is to provide a guard for trolley harps that will not interfere with hangers, frogs, or any of the overhead construction of an electric trolley system.

A further object of this invention is to provide a harp attachment that is inexpensive to manufacture and not liable to injury in ordinary use.

I attain the above objects by a mechanical construction that will be hereinafter specifically described and then claimed.

Reference will now be had to the drawings, wherein—Figure 1 is a side elevation of the trolley partly broken away and partly in section, and Fig. 2 is a front elevation of the same, partly broken away and partly in section.

The reference numeral 1 denotes a portion of the trolley pole having the upper end thereof formed integral with a harp 2, said harp having diametrically opposed arms 3. The arms 3 have oppositely disposed openings 4 for a journal pin 5, which is retained in engagement with the arms 3 by nuts 6 or other fastening means. Revolubly mounted upon the journal pin 5 is a conventional form of trolley wheel 7.

The arms 3 adjacent the inner ends thereof are provided with openings 8 and arranged in these openings are pins 9. Loosely mounted upon the pins 9 are the apertured ends 10 of yokes 11. The apertured ends 10 of the yokes 11 are retained upon the ends of the pins 9 by washers 12 and cotter pins 13. The yokes 11 loosely fit upon the arms 3 of the harp, said yokes corresponding in width to said arm and having the upper ends thereof extending to a point above the periphery of the trolley wheel 7.

The upper ends of the yokes are rounded, as at 14, and provided with central outwardly extending journal pins 15. Revolubly mounted upon these pins, and bearing upon the upper rounded ends 14 of the yokes are wheels 16 which are retained upon the journal pins 15 by washers 17 and cotter pins 18. The wheels 16 have the upper and lower faces thereof beveled, as at 19 whereby said wheels can readily ride into and out of engagement with trolley hangers and other overhead structures. The wheels 16 are of a sufficient diameter to permit of said wheels extending into proximity to each other and at a point above the groove of the trolley wheel 7, whereby said wheel will be normally retained upon the trolley wire, it being impossible, under ordinary conditions, for the trolley wire to pass outwardly between the wheels 16.

To normally retain the yokes 11 in position upon the arms 3 and yet permit of said yokes receding when the wheels 16 separate, the arms 3 have recesses 20 to accommodate the inner ends of flat springs 21, said springs being held in the recesses 20 of the arms 3 by the nuts 6.

The upper ends of the springs 21 extend into recesses 22 provided therefor in the outer sides of the yokes 11, and the resiliency of these springs is sufficient to normally hold the wheels 16 in proximity to each other.

The trolley wheel 7 can be removed from the wire in the ordinary and well-known manner, as the wheel 16 will recede and allow the wire to pass between said wheels, when the harp is pulled downwardly relative to the trolley wire.

What I claim is:—

1. The combination with a trolley harp and the wheel thereof, of pins arranged in the arms of said harp, yokes loosely mounted over the arms of said harp and having the ends thereof loosely mounted upon said pins, journal pins carried by the upper ends of said yokes, wheels revolubly mounted upon said journal pins and extending into close proximity to each other above said trolley wheel, and flat springs carried by the outer sides of said harp and extending above said harp into the outer sides of said yokes.

2. The combination with a trolley-harp having the arms thereof provided with a journal pin and a wheel revolubly mounted upon said pin, of pins carried by the arms of said harp, yokes loosely mounted over the arms of said harp and having the inner ends thereof pivotally mounted upon said pins, journal pins carried by the upper ends of said yokes, beveled wheels revolubly mounted upon said journal pins and extending in proximity to each other above the groove of said trolley wheel, flat springs counter-sunk in the outer sides of the arms of said harp and having the upper ends thereof protruding above the arms of said harp into said yokes, and means for simultaneously holding said springs and the journal pin of the trolley wire in engagement with said harp.

In testimony whereof I affix my signature in the presence of two witnesses.

WILLIAM SCHWEPPE.

Witnesses:
 MAX H. SROLOVITZ,
 CHRISTINA T. HOOD.

---

Copies of this patent may be obtained for five cents each, by addressing the "Commissioner of Patents, Washington, D. C."